United States Patent
Woronec

(10) Patent No.: US 7,210,621 B2
(45) Date of Patent: May 1, 2007

(54) SECURE CREDIT CARD AND METHOD AND APPARATUS FOR UTILIZING THE SAME

(76) Inventor: John S. Woronec, 2811 Sanibel La., Lambertville, MI (US) 48144

( * ) Notice: Subject to any disclaimer, the term of this patent is extended or adjusted under 35 U.S.C. 154(b) by 0 days.

(21) Appl. No.: 11/225,525

(22) Filed: Sep. 13, 2005

(65) Prior Publication Data

US 2007/0057037 A1    Mar. 15, 2007

(51) Int. Cl.
- G06K 5/00    (2006.01)
- G06F 17/00   (2006.01)
- G06F 19/00   (2006.01)
- G06Q 40/00   (2006.01)

(52) U.S. Cl. .................. 235/380; 235/375; 235/379; 705/35

(58) Field of Classification Search ............ 235/375, 235/379, 380; 705/35
See application file for complete search history.

(56) References Cited

U.S. PATENT DOCUMENTS

| | | | |
|---|---|---|---|
| 4,614,861 A | 9/1986 | Pavlov et al. | |
| 4,868,376 A | 9/1989 | Lessin et al. | |
| 5,259,649 A * | 11/1993 | Shomron | 283/114 |
| 6,095,416 A | 8/2000 | Grant et al. | |
| 6,257,486 B1 | 7/2001 | Teicher et al. | |
| 6,412,690 B1 * | 7/2002 | Malki | 235/380 |
| 6,805,288 B2 | 10/2004 | Routhenstein et al. | |
| 6,811,082 B2 | 11/2004 | Wong | |
| 6,816,058 B2 | 11/2004 | McGregor et al. | |
| 6,820,803 B1 | 11/2004 | Browning et al. | |
| 2005/0103837 A1 * | 5/2005 | Boyer | 235/380 |

* cited by examiner

Primary Examiner—Thien M. Le
Assistant Examiner—April A. Taylor
(74) Attorney, Agent, or Firm—Marshall & Melhorn LLC

(57) ABSTRACT

A secure credit card and a method of use of the same is shown. A transactional processing system using the method and the secure credit card of the present invention is also shown. The secure credit card has a first group of numbers or symbols which identify a user, and a second group of numbers or symbols, which may be different from the first group of numbers or symbols, and which represent unique information known only to the user, such information not being placed, or encoded, on the secure credit card in any way, so that it cannot be used in credit card theft and fraud. The position and/or number and/or type of symbols in the second group of symbols, or a combination of these, may be used to indicate to a card reader a unique piece of information (the identified information) to be requested from a user to verify a transaction.

16 Claims, 4 Drawing Sheets

SECURE CREDIT CARD AND METHOD AND APPARATUS FOR UTILIZING THE SAME

BACKGROUND OF THE INVENTION

1. Field of the Invention

The present invention relates generally to the field of credit card security. More particularly, the present invention relates to a simplified method and apparatus for providing credit card security. Most particularly, the present invention relates to a credit card or debit card having a first group of numbers or symbols which identify a user, and a second group of numbers or symbols, which may be different from the first group of numbers or symbols, and which represent information known only to the cardholder. The information known only to the user is not placed, or encoded, on the secure credit card in any way, so that it cannot be used in credit card theft and/or fraud.

2. Description of the Prior Art

Credit cards, and more recently debit cards, have been in use in the United States and around the world. The unauthorized or fraudulent use of such credit or debit cards for goods and services has been with the credit card and bankcard industry ever since the inception of the credit or debit card. Much of the problem of fraudulent use of such cards is due to the fact that all the information on the front of the credit card has also been contained on one or more magnetic stripes having one or more, but typically three, tracks for storing all the personal and credit card information.

This is convenient for present day card reading systems, but can be decoded rather easily by one wishing to practice credit card fraud. Consequently, it is easy to use this information to create illegally any number of credit cards containing the user's personal information. Many solutions have been offered to solve the problem of credit card and bankcard fraud and theft, and all of them are becoming more and more complicated, and require completely revamping or replacing existing magnetic card readers.

U.S. Pat. No. 4,614,816 to Pavlov, et al. shows a unitary self-contained card which does not require interaction with a fixed terminal device to prevent monitoring of confidential information contained with the card personal identification number ("PIN"). The unitary self-contained card has the ability to verify a PIN, which is entered directly into the card by way of a keyboard.

U.S. Pat. No. 4,868,376 to Lessin, et al., shows an intelligent, portable, interactive personal data system having a microprocessor with memory contained in the credit card housing. An alphanumeric keypad and display is located on a surface of the housing.

U.S. Pat. No. 6,095,416 to Grant, et al., shows an authorization card, such as a credit card, having a security feature. The authorization card generally has two operational states, a disabled state and enabled state. In the disabled state, which is the default mode of operation, access to confidential information stored on the card is denied. The card remains in the disabled state until a PIN code is entered on a keypad provided on the card. Once the card is enabled, access to the confidential information is permitted for a predetermined period of time.

U.S. Pat. No. 6,257,486 B1 to Tiecher, et al., shows a smart card having a microprocessor contained within the card, with the user's PIN entered directly into the smart card and authenticated directly by the smart card itself, and not propagated outside the smart card.

U.S. Pat. No. 6,811,082 B2 to Wong describes a novel bridge device to link the world of smart cards to that of magnetic finance cards.

U.S. Pat. No. 6,816,058 B2 to MacGregor, et al. shows a card where a biometric sensor device is integrated into the credit card or debit card.

All of the above devices decrease the possibility of fraudulent debit or credit card use, but certainly do not eliminate it, because they all use electronic devices which can be decoded by one intent on credit card fraud. They are also relatively expensive. The aforementioned U.S. Pat. No. 6,257,486 B1 discusses in detail the security problems of so-called "smart" cards.

SUMMARY OF THE INVENTION

The present invention overcomes the above-discussed problems with credit card fraud by providing a secure credit card having minimal information encoded thereon, and no critical information which can be obtained by decoding. Instead, a first group of symbols, and a second group of symbols, which may be entirely different in type, number or style from the first group of symbols, is provided. The second group of symbols will typically be a group of X's replacing a group of numbers present on the typical prior art credit card. Only the first group of symbols is contained on a magnetic stripe on the back of the card or chip. This results in a credit or debit card which is more secure than other so-called "smart" cards, but is much less complicated, and less expensive.

BRIEF DESCRIPTION OF THE DRAWINGS

The present invention will be readily understood by the following detailed description in conjunction with the accompanying drawings, wherein in like reference numerals designate like elements in the several views.

DETAILED DESCRIPTION OF THE INVENTION

Figure 1:
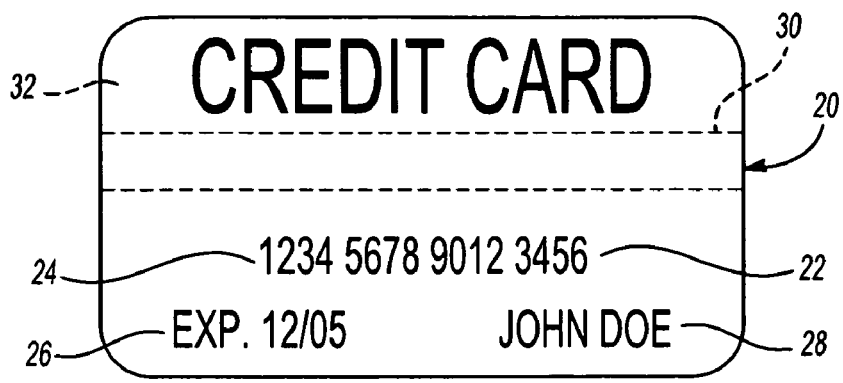
FIG. 1 shows a first prior art credit card.

FIG. 1 shows a typical prior art credit, debit or bankcard 20. There is permanently displayed on the front face 22 thereof a multi-digit number 24, typically sixteen numbers in four groups of four numbers, representative of the cardholder's debit or credit account number. Also displayed on the front face 22 are the expiration date 26 and cardholder's name 28. A magnetic stripe 30 is typically found on the back face or surface 32 of card 20 and contains in magnetic form at least the information displayed on the front surface 22. To process a transaction using the card 20, a seller may use a magnetic stripe reader, and by sliding at least the upper portion of the card 20 through a slot to read the information stored on the magnetic stripe, may obtain an authorization for a credit card transaction by means well known in the art. It is the possibility of decoding this magnetic stripe that makes possible the widespread credit card fraud practiced today.

Figure 2:
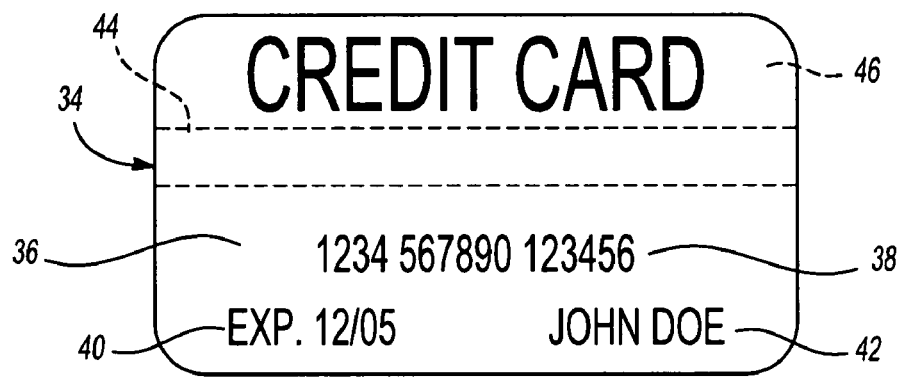
FIG. 2 shows a second prior art credit card.

FIG. 2 shows a second prior art credit card 34 having permanently displayed on the front face or surface 36 a fifteen-digit number 38 representative of the cardholder's debit or credit or bank account number. Also displayed on the front surface 36 are the expiration date 40 and cardholder's name 42. Again, a magnetic stripe 44 is typically found on the back surface 46 of card 34 and contains at least the information displayed on the front surface 36. To process a transaction using the card 34, the seller again uses a card reader, and slides at least the upper portion of card 34 through a slot to read the information stored on the magnetic stripe. Again, this card provides no better solution to the problem of credit card fraud because of the possibility of decoding the magnetic stripe 44 to obtain all the necessary information to make counterfeit credit cards.

Figure 3:
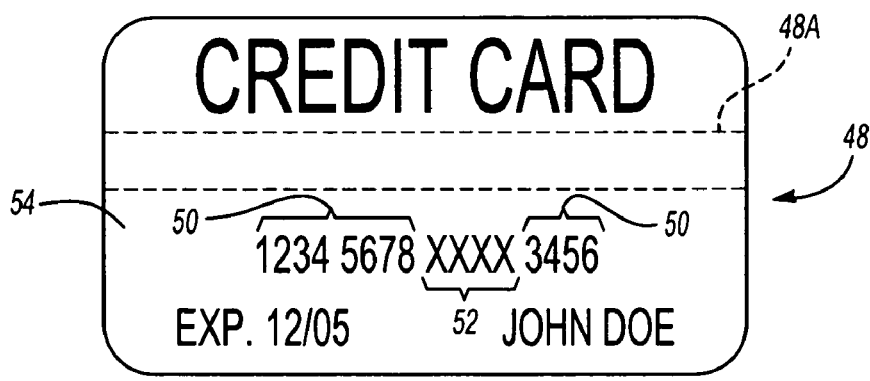
FIG. 3 shows the secure card of the present invention.
Figure 3A:
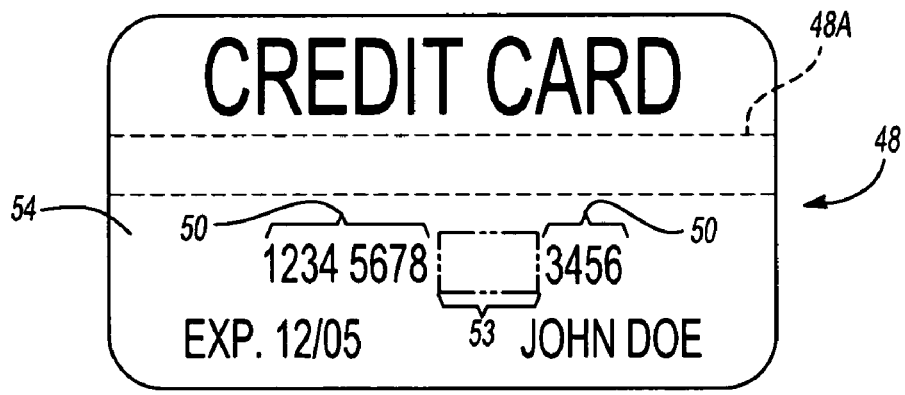
FIG. 3A shows a modification of the construction shown in FIG. 3, which is also usable with the constructions shown in FIGS. 4 and 5.

FIG. 3 shows an improved secure credit or debit card 48 embodying the present invention. This card has a first group of symbols 50 on the front face or surface 54, which may consist of one or more subgroups having an equal or different number of digits, and a second group of symbols 52, representing information known only to the cardholder. Information identifying the first group of symbols 50 is encoded on magnetic stripe 48A as in the prior art cards. With regard to the second group of symbols 52, these may be encoded as in the prior art, but it is preferable that only information on the number and/or position and/or type of the second group of symbols 52 will be encoded on magnetic stripe 52. Also, it is well within the scope of the present invention that any of the second group of symbols (52A–52C) be replaced by a blank area 53, as shown in FIG. 3A.

A novel feature of the secure credit card 48 is that the position of the second group of symbols 52 (or blank 53) on the card 48, or the number or type of symbols in the second group of symbols 52, or both, may be used to indicate a piece or pieces of information known only to the cardholder, but the information known only to the cardholder is never encoded on the card. In the preferred embodiment, this second group of symbols 52 is simply a group of four X's representative of a unique number only known to the user. Normally, in the preferred embodiment, four Xs would be representative of a four-digit number only known to the cardholder, but four digits could be representative of a longer or shorter number, or other piece of information, and the symbols could be alphabetic, numeric, or alphanumeric symbols, as desired.

Figure 4:
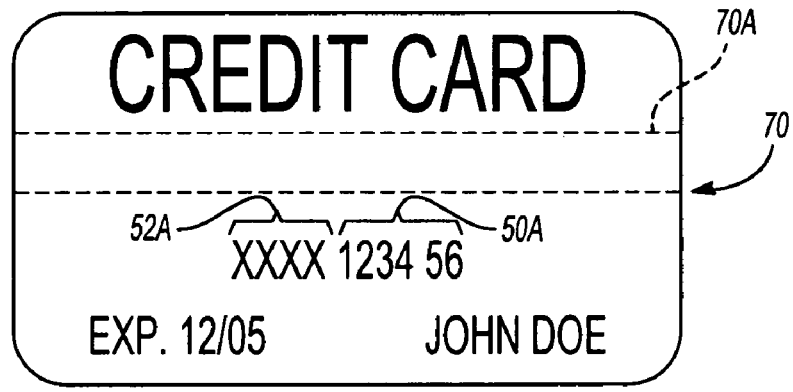
FIG. 4 shows a modification of the present invention.

With reference to FIG. 4, there is shown a modification of the present invention. A first modified secure card 70 is illustrated, which is substantially similar to the secure card 48 shown in FIG. 3, except the modified first group of symbols 50A is now placed completely to one side of the modified second group of symbols 52A. As will be explained, this difference in position can be utilized by a card reader to determine what information to request from the cardholder. As before, only information relating to the modified first group of symbols 50A is encoded on magnetic stripe 70A, either as in the prior art, or per se. Preferably, only information on the number and/or position and/or type of the modified second group of symbols 52A will be encoded on magnetic stripe 52, and the information to be requested from the cardholder is never encoded on the modified secure card 70. As with the construction illustrated in FIG. 3, it is well within the scope of the present invention that a blank 53 (FIG. 3A) could replace the modified second group of symbols 52A.

Figure 5:
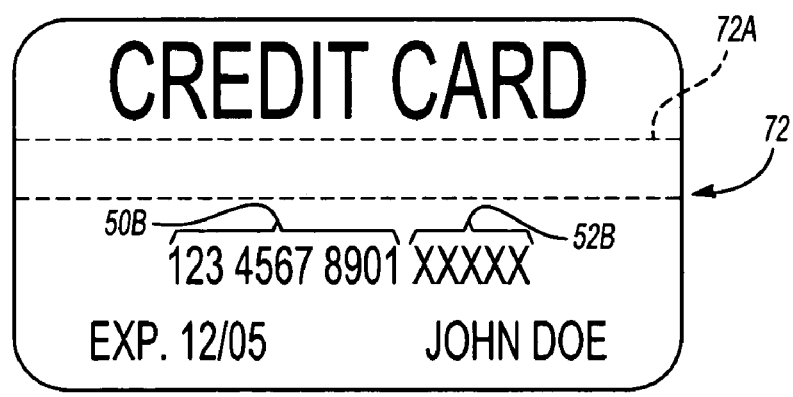
FIG. 5 shows a further modification of the present invention.
Figure 6:
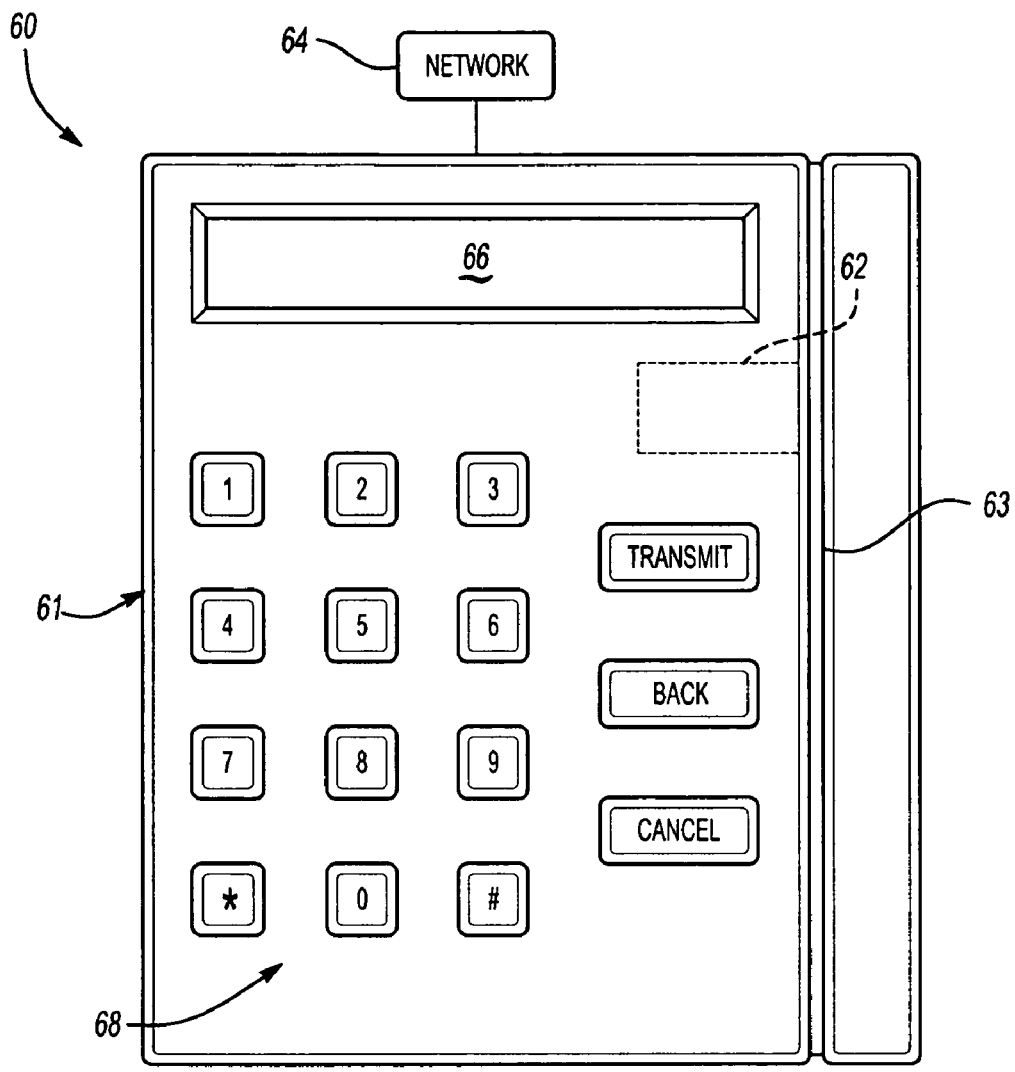
FIG. 6 is a schematic diagram showing a credit card and transactional processing system embodying the present invention.
Figure 6:

With reference to FIG. 5, there is shown a further modification of the present invention. A second modified secure card 72 is illustrated which is again substantially similar to the secure card 48 shown in FIG. 3, except the second modified first group of symbols 50B is now different in number and completely to the other, or left side, of the second modified second group of symbols 52B. This difference may be utilized by a card reader to request a different piece of information from the cardholder. Only information relating to the second modified first group of symbols 50B is encoded on magnetic stripe 72A, either as in the prior art, or per se. Information on the second modified second group of symbols 52B is also encoded on the magnetic stripe 72A. Preferably, only information on the number and/or position and/or type of the second modified second group of symbols 52B will be encoded on magnetic stripe 52. As with the construction illustrated in FIG. 3, it is well within the scope of the present invention that a blank 53 (FIG. 3A) could replace the second modified second group of symbols 52B Referring to FIGS. 3 and 6, there is shown the secure card system 60 of the present invention. System 60 may include a terminal 61, which may include a card reader 62, which may be any magnetic or optical card reader known in the art which is capable of reading the first group of symbols 50 from the magnetic stripe 56 on the rear face or surface 48A, or directly from the front face or surface 54 of secure card 48.

The terminal 61 may be similar in appearance to present day terminals, and may have a slot 63 into which the secure card 48 of the present invention will be inserted and slid past a card reader 62 as in any present day card reading system. However, in the preferred embodiment, instead of reading at least all of the information on the front of the card from a magnetic stripe (30, 44) (see FIGS. 1–2) on the back of the card, as in the prior art systems, the reader will read the first group of symbols 50 from the magnetic stripe 48A, as well as information on the number and/or position and/or type of second group of symbols 52, modified second group of symbols 52A, second modified second group of symbols 52C or blank 53. The card reader 62 will transmit this information to a network 64 which identifies the user by the first group of symbols, and knows by the information on the second group of symbols or blank that the cardholder is using a secure card and what information to request.

The network looks up or determines the information known only to the user, and displays a message on the screen 66 indicating that the cardholder should now type in the needed information for the transaction to continue. In the case of the preferred embodiment, the screen 66 may display the message "Type in unique number" or other similar message.

Using the keypad 68, the cardholder will then type in the information requested on the screen 66. This information will be transmitted to the network 64 by means well known in the art. The network 64 will determine whether the information typed in by the cardholder is correct. Since there is always the possibility that the cardholder may make an error when typing in the information on the keypad 68, if the information is not correct, the system 60 will again request the information. However, if the correct information is not typed in after a finite number of attempts by the card holder, to prevent fraudulent use, an error message will be displayed, and the system 60 will not allow further tries with that particular card.

Figure 7:
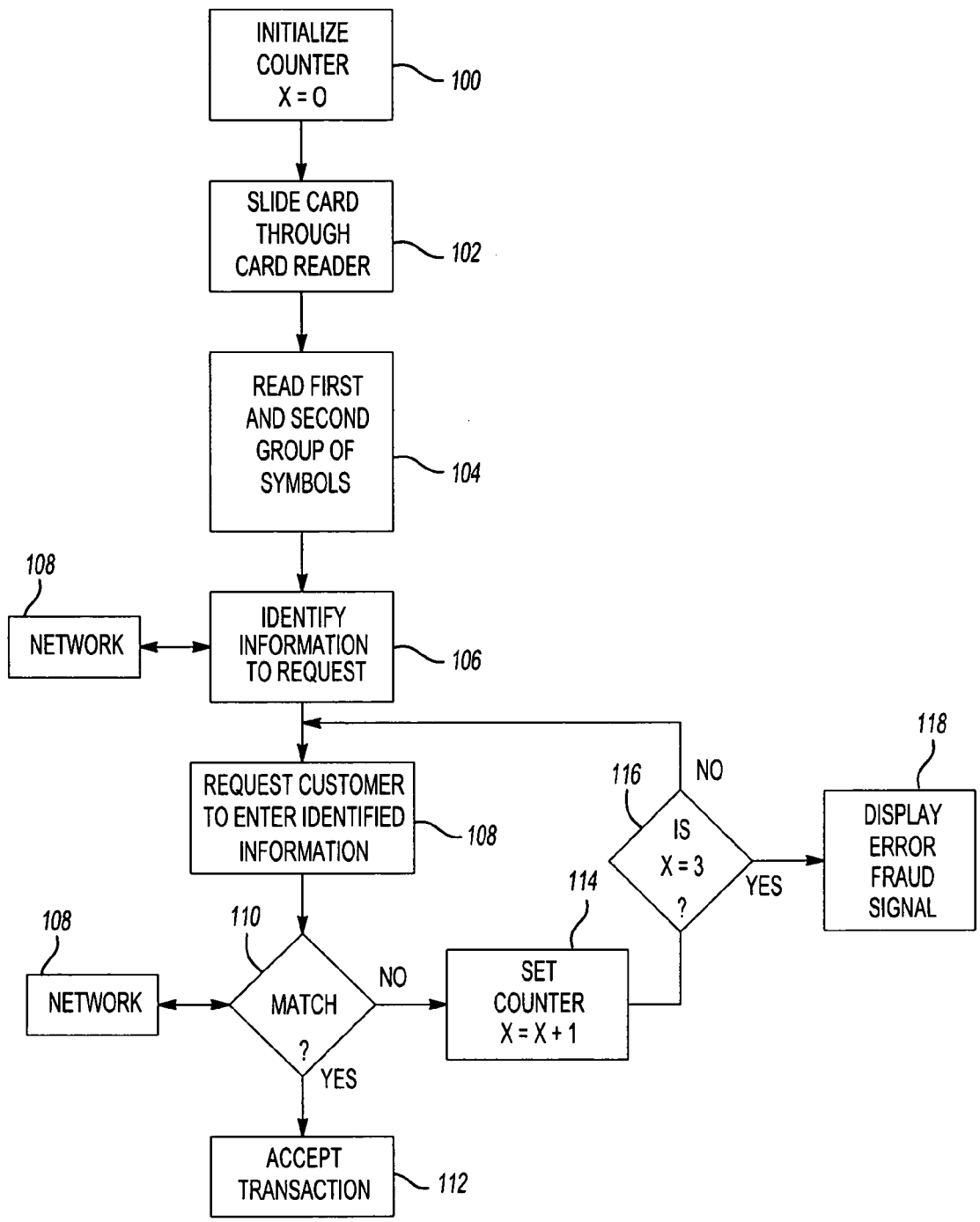
FIG. 7 is a flow chart illustrating some of the steps that may be used in the practice of a method embodying the present invention.

With reference to FIG. 7, the method of operation of the secure card system 60 may be understood. Upon the cardholder placing the secure card 48 in the slot 63 of terminal 61 of the present invention, a counter will be initialized at a predetermined value, in the preferred embodiment "0" (Box 100). As the card 48 is slid through slot 63 (Box 102), the card reader 62 reads information relating to a first group of symbols 50 and (Box 104) from the magnetic stripe 48A on the rear face or surface of the secure card 48. It is within the scope of the present invention that more information be read from the card as long as no information known only to the cardholder is contained on the secure card 48. For example, it is contemplated that the position of the second group of symbols 52 (and/or modified second group of symbols 52A and/or second modified second group of symbols 52C and/or blank 53) with respect to the first group of symbols 50 (for example, the second group 52 is placed first on the card) may be utilized as an additional security feature, for example, to request different or additional information of the type known only to the user or card holder. In this case, information representing the position of the second group of symbols 52 would be encoded on the magnetic stripe 56. However, the security of the system 60 would not be compromised because the potential fraudulent user would still not know what information was being requested from the network 64 because of the placement or number of the second group of symbols 52.

Based on the first symbols 50 and by the type, size, relative position and location of second symbols 52, which is communicated to the network, the secure card system 60 will determine and identify which information to request from the cardholder (Box 106).

Next (Box 108) the cardholder would be requested by a message generated by the network 64 and displayed on screen 66 to type in the identified information by the use of the keypad 68. The network 64 will then determine if the information typed in by the cardholder matches the identified information (Box 110). If it does, the network 64 authorizes or accepts the transaction (Box 112).

If the information typed in by the cardholder did not match the identified information, the counter would be incremented according to the formula x=x+1. In this case, since the counter was initially set to 0 (Box 100), the counter would now have the value 1 (Box 114). The network will then ask "Is x=3?" (Box 116). If "x is not=3", then the cardholder would again be prompted to enter the identified information (Box 108). If the cardholder had made an error when first requested to enter the information, but now has entered the identified information correctly (Box 110), the secure card system 60 would now authorize the transaction.

If for some reason the cardholder did not enter the identified information correctly, the counter would again be incremented by "1" (Box 114). The counter would now have a value of "2", and the system would again ask the question "Is x=3?" (Box 116). Since the answer would be no, the cardholder would again be prompted to enter the identified information (Box 108), the system would determine if the information entered by use of the keypad 68 matched (Box 110). If it did, the secure card system 60 would authorize the transaction (Box 112). If the information entered on the keypad 68 did not match, the above process would continue until "x=3" (Box 116). The secure card system 60 would then not allow any more tries at entering the identified information, and the system 60 would display any error or fraud signal (Box 118). It is well within the scope of the present invention that the counter may be set to display an error or fraud signal (Box 118) at a different value, or that a different series of steps be used as long as the cardholder is only allowed a small number of tries before the system 60 will not permit another try.

There is thus provided a secure credit, debit or bank card 48, and a secure card reading system 60 and method of operation thereof which provides as much or more security as present day or proposed "smart" card systems, but which is much simpler and more cost effective.

The foregoing descriptions and drawings should be considered as illustrative only of the principles of the invention. Numerous applications of the present invention will readily occur to those skilled in the art. Therefore, it is not desired to limit the invention to the specific examples disclosed or the exact construction and operation described. Therefore, it is to be understood that, within the scope of the appended claims, the invention may be practiced other than as specifically described herein.

The invention claimed is:

1. A credit or debit card having a minimal amount of information magnetically encoded thereon, and having on the face thereof a first group of symbols to identify the credit card user, and a second group of symbols, different from the first group of symbols, or a blank, representative of information known only to the credit card user, which is imbedded in the first group of symbols, or is immediately adjacent the first group of symbols in a lateral relationship.

2. The card of claim 1, wherein the user must enter certain requested information into a card reader in order to proceed with a transaction.

3. The card of claim 2, wherein the number of symbols in the second group of symbols, or a blank, will indicate the information to be entered into a card reader.

4. The card of claim 3, wherein the type of the second group of symbols will indicate the information to be entered into a card reader.

5. The card of claim 2, wherein the position or location of the second group of symbols with respect to the first group of symbols will indicate the information to be entered into a card reader.

6. The credit or debit card of claim 1, wherein the second group of symbols is alphabetic, numeric, or alpha-numeric.

7. A credit or debit card having a minimal amount of information magnetically encoded thereon, and having on the face thereof a first group of symbols to identify the credit card user, and a second group of symbols, different from the first group of symbols, or a blank, representative of information known only to the credit card user, where upon reading the second group of symbols, or upon detecting the blank, a card reader will randomly generate identified information to be requested from the cardholder, the identified information being of the type only known to the cardholder.

8. A card reading system including, in combination:
   (a) a card reader capable of reading a credit or debit card of the type having minimal information magnetically encoded thereon, and having on the face thereof a first group of symbols to identify the credit card user, and a second group of symbols, different from the first group of symbols, or a blank, representative of information known only to the credit card user, which is imbedded in the first group of symbols, or is immediately adjacent the first group of symbols in a lateral relationship, said card reader comprising:
   (i) card reading means for reading and identifying a first group of symbols to identify the credit card user, and a second group of symbols, different from the first group of symbols, to indicate information known only to the credit card user;

(ii) memory means contained within the card reading means, or connected to the card reading means, for storing information known only to the holder of the credit or debit card;

(iii) means to determine from the first group of symbols whose credit card is in the card reader;

(iv) means to determine and identify from the second group of symbols and/or blanks, what information is to be requested from the cardholder;

(v) display means to display to the cardholder what information is being requested;

(vi) keypad means for the cardholder to enter the requested information;

(vii) means utilizing the memory means to determine whether the entered information is correct; and (viii) means to authorize a transaction.

9. The system of claim 8, comprising:
(a) a credit or debit card having no information magnetically encoded thereon, and having on the face thereof a first group of symbols to identify the credit card user, and a second group of symbols, different from the first group of symbols, and/or blanks, to indicate information known only to the credit card user; and
(b) an optical card reader to read said first group of symbols and said second group of symbols and/or blanks.

10. A method of securely authorizing a transaction using an account, the method comprising:
(a) reading a credit or debit card having a minimal amount of information magnetically encoded thereon, and having on the face thereof a first group of symbols to identify the credit or debit cardholder, and a second group of symbols, different from the first group of symbols, and/or blanks, which is imbedded in the first group of symbols, or is immediately adjacent the first group of symbols in a lateral relationship, to indicate information known only to the credit card user which is nowhere encoded on the credit card or debit card;
(b) determining from the first group of symbols who the credit or debit cardholder is;
(c) determining from the number and/or position and/or type and/or relative positions of the second group of symbols and/or blanks, identified information, known only to the cardholder, to be requested from the cardholder;
(d) requesting the identified information from the cardholder;
(e) determining if the information supplied by the card holder is the identified information; and
(f) if the information supplied by the cardholder is the identified information, authorizing the transaction.

11. A method for authenticating the user of a credit or debit card, the credit or debit card being associated with identified information known only to the user and having on the face thereof a first group of symbols to identify the credit or debit cardholder, and a second group of symbols, different from the first group of symbols, relating to information known only to the credit card user:
(a) providing at least one reader operative to accept the credit or debit card and having a keypad by which the cardholder can enter the identified information;
(b) having the cardholder present the credit or debit card to the at least one reader;
(c) having the at least one reader read the first group of symbols and identify the credit or debit card cardholder;
(d) determining from the second group of symbols the identified information known only to the user with the aid of a network;
(e) requesting the cardholder to enter the identified information on the keypad;
(f) determining if the information entered on the keypad is the identified information; and
(g) authorizing the transaction if the information entered on the keypad is the identified information.

12. A method for authenticating the user of a credit or debit card, the credit or debit card being associated with identified information known only to the user and having on the face thereof a first group of symbols to identify the credit or debit cardholder, and a second group of symbols, which is imbedded in the first group of symbols, or is immediately adjacent the first group of symbols in a lateral relationship, different from the first group of symbols, relating to information known only to the credit card user:
(a) providing at least one reader operative to accept the credit or debit card and having a keypad by which the cardholder can enter the identified information;
(b) having the cardholder present the credit or debit card to the at least one reader;
(c) having the at least one reader read the first group of symbols and identify the credit or debit card cardholder;
(d) having the at least one reader read the number and/or position and/or type and/or location of the second group of symbols;
(e) determining from the number and/or position and/or type and/or location of the second group of symbols; the identified information known only to the user with the aid of a network;
(f) requesting the cardholder to enter the identified information on the keypad;
(g) determining if the information entered on the keypad is the identified information; and
(h) authorizing the transaction if the information entered on the keypad is the identified information.

13. The method defined in claim 12, wherein the at least one reader is a magnetic card reader.

14. The method as defined in claim 12, wherein the number and/or position and/or type of the second group of symbols determine what type of identified information will be requested from the cardholder.

15. A method for authenticating the user of a credit or debit card, the credit or debit card being associated with identified information known only to the user and having on the face thereof a first group of symbols to identify the credit or debit cardholder, and a second group of symbols, different from the first group of symbols, relating to information known only to the credit card user:
(a) providing at least one reader operative to accept the credit or debit card and having a keypad by which the cardholder can enter the identified information;
(b) having the cardholder present the credit or debit card to the at least one reader;
(c) having the at least one reader read the first group of symbols and identify the credit or debit card cardholder;
(d) having the at least one reader read the number and/or position and/or type and/or location of the second group of symbols;

(e) determining from the number and/or position and/or type and/or location of the second group of symbols; the identified information known only to the user with the aid of a network;

(f) requesting the cardholder to enter the identified information on the keypad;

(g) determining if the information entered on the keypad is the identified information; and (h) authorizing the transaction if the information entered on the keypad is the identified information, wherein the at least one reader is an optical card reader.

16. The method as defined in claim 15, wherein the identified information to be requested from the cardholder is randomly selected from a group of information known only to the user.

* * * * *